(12) United States Patent
Kwon et al.

(10) Patent No.: US 10,508,164 B2
(45) Date of Patent: Dec. 17, 2019

(54) LOW DENSITY POLYETHYLENE COPOLYMER HAVING EXCELLENT FILM PROCESSABILITY AND TRANSPARENCY

(71) Applicant: LG Chem, Ltd., Seoul (KR)

(72) Inventors: Oh Joo Kwon, Daejeon (KR); Sol Cho, Daejeon (KR); Ki Soo Lee, Daejeon (KR); Heon Yong Kwon, Daejeon (KR); Dae Sik Hong, Daejeon (KR); Sung Hyun Park, Daejeon (KR); Myung Han Lee, Daejeon (KR)

(73) Assignee: LG Chem, Ltd. (KR)

( * ) Notice: Subject to any disclaimer, the term of this patent is extended or adjusted under 35 U.S.C. 154(b) by 43 days.

(21) Appl. No.: 15/546,474

(22) PCT Filed: Dec. 23, 2016

(86) PCT No.: PCT/KR2016/015231
§ 371 (c)(1),
(2) Date: Jul. 26, 2017

(87) PCT Pub. No.: WO2017/111552
PCT Pub. Date: Jun. 29, 2017

(65) Prior Publication Data
US 2018/0016372 A1    Jan. 18, 2018

(30) Foreign Application Priority Data
Dec. 23, 2015  (KR) .................. 10-2015-0184611

(51) Int. Cl.
*C08F 210/02* (2006.01)
*C08F 210/16* (2006.01)

(52) U.S. Cl.
CPC ........ *C08F 210/16* (2013.01); *C08F 2500/01* (2013.01); *C08F 2500/08* (2013.01); *C08F 2500/11* (2013.01); *C08F 2500/12* (2013.01); *C08F 2500/17* (2013.01)

(58) Field of Classification Search
CPC .............. C08F 210/16; C08L 23/0807; C08L 23/0815; C08L 2203/16
See application file for complete search history.

(56) References Cited

U.S. PATENT DOCUMENTS

| | | | |
|---|---|---|---|
| 6,153,549 A | 11/2000 | Hubscher et al. | |
| 7,132,486 B2 * | 11/2006 | Dekmezian | C08F 210/16 526/119 |
| 2010/0317804 A1 * | 12/2010 | Karjala | C08F 10/02 525/240 |
| 2011/0040052 A1 | 2/2011 | Bburton et al. | |
| 2011/0098422 A1 | 4/2011 | Li et al. | |
| 2011/0171407 A1 | 7/2011 | Mazzola et al. | |
| 2011/0172322 A1 * | 7/2011 | Michel | C08F 10/02 521/144 |
| 2012/0130019 A1 * | 5/2012 | Karjala | C08F 210/16 525/240 |
| 2013/0345377 A1 * | 12/2013 | Ker | C08F 210/16 526/147 |
| 2014/0179873 A1 * | 6/2014 | Lam | C08L 23/06 525/240 |
| 2015/0112039 A1 | 4/2015 | Karjala et al. | |
| 2015/0210840 A1 * | 7/2015 | Kapur | C08L 23/0815 525/240 |
| 2015/0239916 A1 | 8/2015 | Do et al. | |
| 2015/0259445 A1 * | 9/2015 | Kapur | C08F 210/16 526/348.5 |
| 2017/0081437 A1 * | 3/2017 | Lernoux | C08F 210/16 |
| 2017/0081444 A1 * | 3/2017 | Wang | E01C 13/08 |
| 2017/0320978 A1 * | 11/2017 | Jeong | C08F 10/08 |

FOREIGN PATENT DOCUMENTS

| | | |
|---|---|---|
| CN | 104797586 A | 7/2015 |
| JP | H10158287 A | 6/1998 |
| JP | 2015078337 A | 4/2015 |
| JP | 2015532338 A | 11/2015 |
| JP | 2015535011 A | 12/2015 |
| KR | 20070098276 A | 10/2007 |
| KR | 101094556 B1 | 12/2011 |
| KR | 20120036832 A | 4/2012 |
| KR | 20120052309 A | 5/2012 |
| KR | 20120116432 A | 10/2012 |
| KR | 101197946 B1 | 11/2012 |
| KR | 20120123310 A | 11/2012 |
| WO | 2013188950 A1 | 12/2013 |
| WO | 2015200740 A2 | 12/2015 |

OTHER PUBLICATIONS

International Search Report for Application No. PCT/KR2016/015231 dated Apr. 5, 2017.
M. Chiu et al., Zirconium Complexes, "Synthesis, Structural Characterization, and Quantitative Basicity Studies of Lithium Zirconimidate Complexes", Angew. Chem. Int., 2008, vol. 47, p. 6073-6076.
V.R. Raju et al., "Properties of Amorphous and Crystallizable Hydrocarbon Polymers. I. Melt Rheology of Fractions of Linear Polyethylene", Journal of Polymer Science: Polymer Physics Edition, Jan. 1979, vol. 17, pp. 1183-1195.
Extended European Search Report for Application No. EP16879419 dated Mar. 15, 2018.
Chinese Search Report for Application No. CN 201680010597.5 dated Mar. 21, 2019.

* cited by examiner

*Primary Examiner* — Rip A Lee
(74) *Attorney, Agent, or Firm* — Lerner, David, Littenberg, Krumholz & Mentlik, LLP

(57) ABSTRACT

The low density polyethylene copolymer according to the present invention is characterized in that as LCB (Long Chain Branch) is introduced into LLDPE, the melt strength is remarkably high even without blending with LDPE, and thus it can be advantageously applied to blown film processing and the like.

11 Claims, 1 Drawing Sheet

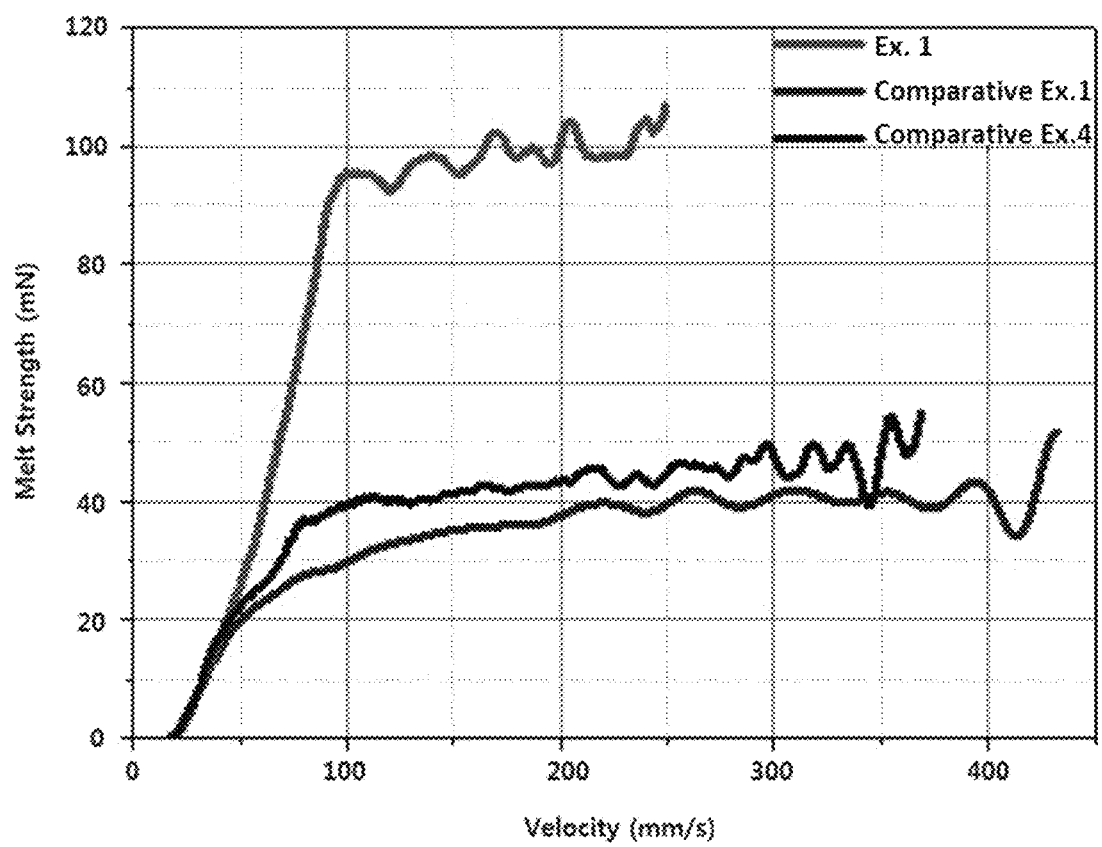

LOW DENSITY POLYETHYLENE COPOLYMER HAVING EXCELLENT FILM PROCESSABILITY AND TRANSPARENCY

CROSS-REFERENCE TO RELATED APPLICATION(S)

The presentation application is a national phase entry under 35 U.S.C § 371 of International Application No. PCT/KR2016/015231 filed Dec. 23, 2016, published in Korean, which claims priority from Korean Patent Application No. 10-2015-0184611 filed on Dec. 23, 2015, the disclosures of which are incorporated herein by reference.

TECHNICAL FIELD

The present invention relates to a low density polyethylene copolymer having excellent film processability and transparency.

BACKGROUND ART

Olefin polymerization catalyst systems can be classified into Ziegler-Natta and metallocene catalyst systems. Among them, the metallocence catalyst comprises a combination of a main catalyst whose main component is a transition metal compound, and an organometallic compound cocatalyst whose main component is aluminum. Such a catalyst is a single-site catalyst which is a homogeneous complex catalyst, and offers a polymer having a narrow molecular weight distribution and a uniform composition distribution of comonomers, depending on the single site characteristics. The metallocence catalyst has characteristics which can control the stereoregularity, copolymerizing properties, molecular weight, crystallinity degree and the like of the resulting polymer by changing the ligand structure of the catalyst and the polymerization condition.

On the other hand, a linear low density polyethylene (LLDPE) is produced by copolymerizing ethylene and alpha olefin using a polymerization catalyst under low pressure. Thus, this is a resin having a narrow molecular weight distribution and a certain length of a short chain branch, without a long chain branch. The LLDPE film has high strength and elongation at break in addition to the properties of a general polyethylene and exhibits excellent tear strength, falling weight impact strength or the like. This has led to an increase in the use of a stretch film, an overlapping film or the like which is difficult to apply existing low density polyethylene or high density polyethylene.

However, LLDPE has poor processability for a blown film compared to excellent mechanical properties. A blown film is a film produced by a method of blowing air into a molten plastic and inflating it, which is also called an inflation film.

As factors to be taken into consideration when processing a blown film, bubble stability, processing load, etc. must be considered, and especially, bubble stability should be considered important. The bubble stability means a property that, when the film is produced by injecting air into the molten plastic, the produced film maintains its shape without being torn, which is associated with a melt strength (MS).

The melt strength refers to a strength for maintaining a shape capable of withstanding the molding and processing in a softened and melted state. The melt strength of low density polyethylene (LDPE) is higher than that of LLDPE. This is because in the case of LDPE, branched chains are entangled with each other as compared to LLDPE, which is more advantageous in withstanding the molding and processing. Therefore, in order to complement the melt strength of LLDPE, a film is produced by blending LDPE, but there is a disadvantage that it is impossible to avoid degradation of physical properties due to blending of LDPE.

In view of the above, the present inventor has found that LCB (Long Chain Branch) is introduced into LLDPE and thus, the low density polyethylene having a remarkably high melt strength can be produced without blending with LDPE. The present invention has been completed on the basis of such finding.

DETAILED DESCRIPTION OF THE INVENTION

Technical Problem

It is an object of the present invention to provide a low density polyethylene copolymer having excellent film processability and transparency.

Technical Solution

In order to achieve the above object, the present invention provides a low density polyethylene copolymer which satisfies the following conditions:

a melt index (MI) of 0.5 to 1.5 g/10 min as measured according to ASTM D1238 (2.16 kg, 190° C.), a density 0.910 to 0.930 g/cm$^3$ as measured according to ASTM D792, a weight average molecular weight of 91,000 to 150,000, and a melt strength (MS) of 40 to 100 mN.

The term "low density polyethylene copolymer" as used herein means that LCB (Long Chain Branch) is introduced into a linear low density polyethylene copolymer.

Also, preferably, the low density polyethylene copolymer according to the present invention has $\eta_0$ (zero shear viscosity) of 140,000 P (poise) or more, $\eta_{500}$ (viscosity measured at 500 rad/s) of 7,000 P (Poise) or less. The shear viscosity was measured using an ARES instrument at 190° C. at a frequency ($\omega$ [rad/s]) range from 0.05 to 500. Thereafter, the viscosity $\eta_0$ at a frequency of zero and the viscosity ($\eta_{500}$) at the frequency of 500 can be obtained using an Ellis model fit.

More preferably, the $\eta_0$ (P) is 150,000 or more, 160,000 or more, 170,000 or more, 180,000 or more, 190,000 or more, 200,000 or more, 210,000 or more, or 220,000 or more, and 300,000 or less, 290,000 or less, 280,000 or less, or 270,000 or less. Still more preferably, the $\eta_{500}$ (P) is 6900 or less, 6800 or less, 6700 or less, or 6,600 or less, and 4000 or more, 4500 or more, or 5000 or more.

Further, preferably, the low density polyethylene copolymer according to the present invention has a weight average molecular weight of 92,000 or more, 93,000 or more, 94,000 or more, 95,000 or more, 96,000 or more, 97,000 or more, 98,000 or more, 99,000 or more, or 100,000 or more, and 129,000 or less, 128,000 or less, 127,000 or less, 126,000 or less, or 125,000 or less.

Further preferably, the low density polyethylene copolymer according to the present invention has Mz (Z-average molecular weight) of 200,000 to 380,000. More preferably, the Mz is 210,000 or more, or 220,000 or more, and 370,000 or less, 360,000 or less, or 350,000 or less.

Further preferably, the Mz/Mw is 2.0 to 3.0. Further preferably, the low density polyethylene copolymer according to the present invention has a molecular weight distribution (Mw/Mn) of 2.5 to 3.5.

The low density polyethylene copolymer according to the present invention has an LCB (Long Chain Branch) introduced therein. The degree of introduction of LCB can be defined by an LCB shift factor ($\alpha_M$), and specifically it is represented by the following Mathematical Formula 1:

$$K\alpha_M = \frac{\eta_0(LCB, \exp)}{\eta_0(LCB, \text{cal})} - \frac{\eta_0(lin, \exp)}{\eta_0(lin, \text{cal})} \quad \text{[Mathematical Formula 1]}$$

The Mathematical Formula 1 means a ratio $\eta_0$ (LCB,exp)/$\eta_0$ (LCB,cal)) between the actually measured zero shear viscosity and the theoretically calculated zero shear viscosity, wherein the content of LCB is quantified using the fact that the zero shear viscosity increases with the degree of introduction of LCB. The theoretically calculated zero shear viscosity is calculated as $3.4 \times 10^{-15} \times \text{Mw}^{3.6}$ (J. Polym. Sci., Polym. Phys. Ed. 17, 1183-1195 (1979)). In addition, the ratio ($\eta_0$(lin,exp)/$\eta_0$(lin,cal)) between the theoretically calculated zero shear viscosity and the actually measured zero shear viscosity for the linear low density polyethylene without LCB is corrected. In the present invention, it is based on the linear low density polyethylene (LG LUCENE SP 312) having a weight average molecular weight of 125,381, and the constant K is $1/(3.4 \times 10^{-2})$. In this regard, the Mathematical Formula 1 is represented by the following Mathematical Formula 1-1:

$$\alpha_M = \left( \frac{\eta_0}{3.4 \times 10^{-15} \times \text{Mw}^{3.6}} - \frac{84,000}{3.4 \times 10^{-15} \times 125,381^{3.6}} \right) \times 3.4 \times 10^{-2} \quad \text{[Mathematical Formula 1-1]}$$

In the Mathematical Formula 1-1, $\eta_0$ and Mw are as described above, and take values excluding P and g/mol which are the respective units.

Preferably, the $\alpha_M$ is 0.1 to 3.0. Unlike the conventional linear low density polyethylene copolymer, the low density polyethylene copolymer according to the present invention enhances the resistance to extension during film processing due to the introduction of LCB, and thereby increases the melt strength to be described later.

Further, the low density polyethylene copolymer according to the present invention satisfies the following Mathematical Formula 2:

$$(1.6 \times (\text{Mz}/10^5)^{2.8} + 26 \times (\alpha_M)^{0.25}) < \text{Ms} < (2.1 \times (\text{Mz}/10^5)^{2.8} + 28 \times (\alpha_M)^{0.25}) \quad \text{[Mathematical Formula 2]}$$

In Mathematical Formula 2, Ms, Mz and M are as described above, respectively, and take values excluding mN and g/mol which are the respective units. The Mathematical Formula 1 means the influence of Mz and $\alpha_M$ on Ms. According to one embodiment of the present invention, the low density polyethylene copolymer of the present invention satisfies the above mathematical formula, whereas those of the comparative examples do not satisfy the Mathematical Formula 1.

In addition, the low density polyethylene copolymer according to the present invention preferably has an MI (melt index) of 0.9 to 1.1 g/10 min as measured according to ASTM D1238 (2.16 kg, 190° C.). Further, preferably, the MFRR(MFR$_{21.6}$/MFR$_{2.16}$) is 25 to 37. Within the above range, it is excellent in film processability, and is particularly suitable for producing a blown film.

Further, the low density polyethylene copolymer according to the present invention has a melt strength of 40 to 100 mN as measured at 190° C. The measurement conditions of the melt strength are as follows.

capillary: length 30 mm, diameter 2 mm, shear rate 72/s
wheel: initial speed 18 mm/s, acceleration 12 mm/s$^2$ Specifically, a molten low density polyethylene copolymer was filled in a rheometer equipped with a capillary having an aspect ratio (30 mm in length/2 mm in diameter) of 15 and then applied to a shear rate of 72/s to prepare a strand, and then the melt strength was measured by a method of measuring the force (mN) at the time of breakage while uniaxially stretching it with an accelerating wheel at an initial speed of 18 mm/s and an acceleration of 12 mm/s$^2$.

More preferably, the melt strength is 50 to 100 mN, 60 to 100 mN, 70 to 100 mN, 80 to 100 mN, or 90 to 100 mN.

Further, preferably, the low density polyethylene copolymer according to the present invention has a haze value of 20 or less as measured according to ISO 14782. More preferably, the haze value is 19 or less, 18 or less, 17 or less, 16 or less, 15 or less, 14 or less, 13 or less, 12 or less, 11 or less, or 10 or less, and more than 0.

Further, preferably, the low density polyethylene copolymer according to the present invention is a copolymer of ethylene and an alpha-olefin having 2 to 20 carbon atoms.

As the alpha-olefin, one or more selected from the group consisting of 1-butene, 1-pentene, 1-hexene, 4-methyl-1-pentene, 1-octene, 1-decene, 1-dodecene, 1-tetradecene, 1-hexadecene, 1-octadecene, and 1-eicosene may be used. In the ethylene/alpha-olefin copolymer, the content of the alpha-olefin may be about 0.5 to about 10% by weight, preferably about 1 to about 5% by weight, but is not limited thereto.

The low density polyethylene copolymer according to the present invention can be produced using a metallocene catalyst. The usable metallocene catalyst may be a hybrid catalyst containing a metallocene catalyst represented by the following Chemical Formula 1, and a metallocene catalyst represented by the following Chemical Formula 2 or Chemical Formula 3:

[Chemical Formula 1]

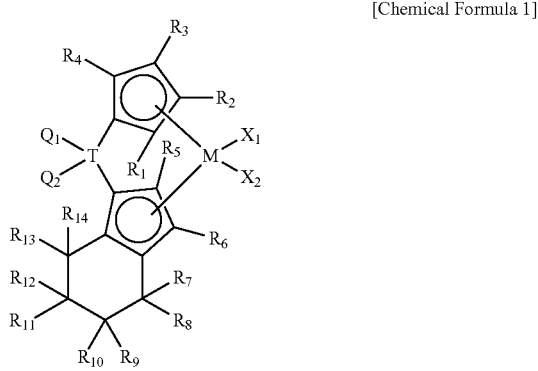

in Chemical Formula 1,
M is Ti, Zr, or Hf,
$X_1$ and $X_2$ are the same as or different from each other and are each independently any one selected from halogen, a nitro group, an amido group, a phosphine group, a phosphide group, an alkyl group having 1 to 20 carbon atoms, an alkoxy group having 1 to 20 carbon atoms, an alkoxyalkyl group having 2 to 20 carbon atoms, a silyl group having 1 to 20 carbon atoms, an alkenyl group having 2 to 20 carbon atoms, an aryl group having 6 to 20 carbon atoms, a sulfonate group having 1 to 20 carbon atoms, and a sulfone group having 1 to 20 carbon atoms, T is C, Si, Ge, Sn, or Pb, $Q_1$ and $Q_2$ are the same as or different from each other and are each independently any one selected from hydrogen, halogen, an alkyl group having 1 to 20 carbon atoms, a heterocycloalkyl group having 2 to 20 carbon atoms, an alkoxy group having 1 to 20 carbon atoms, an alkoxy alkyl group having 1 to 20 carbon atoms, a carboxylate having 1 to 20 carbon atoms, an alkenyl group having 2 to 20 carbon atoms, an aryl group having 6 to 20 carbon atoms and a heteroaryl group having 5 to 20 carbon atoms, $R_1$ to $R_6$ are the same as or different from each other, and are each independently any one selected from hydrogen, an alkyl group having 1 to 20 carbon atoms, an alkoxy group having 1 to 20 carbons, an alkoxyalkyl group having 2 to 20 carbons, a silyl group having 1 to 20 carbons, a silylalkyl group having 1 to 20 carbon atoms, a silyloxyalkyl group having 1 to 20 carbon atoms, an alkenyl group having 2 to 20 carbon atoms and an aryl group having 6 to 20 carbon atoms, $R_7$ to $R_{14}$ are the same as or different from each other and are each independently any one selected from hydrogen, an alkyl group having 1 to 20 carbon atoms, an alkoxy group having 1 to 20 carbons, an alkoxyalkyl group having 2 to 20 carbons, a silyl group having 2 to 20 carbons, a silylalkyl group having 1 to 20 carbon atoms, a silyloxyalkyl group having 1 to 20 carbon atoms, an alkenyl group having 2 to 20 carbon atoms and an aryl group having 6 to 20 carbon atoms, or at least one pair of adjacent substituents of the $R_7$ to $R_{14}$ are connected to each other to form a substituted or unsubstituted aliphatic or aromatic ring;

[Chemical Formula 2]

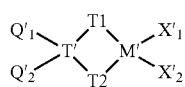

in Chemical Formula 2,

M' is Ti, Zr, or Hf, $X'_1$ and $X'_2$ are the same as or different from each other and are each independently any one selected from halogen, a nitro group, an amido group, a phosphine group, a phosphide group, an alkyl group having 1 to 20 carbon atoms, an alkoxy group having 1 to 20 carbon atoms, an alkoxyalkyl group having 2 to 20 carbon atoms, a silyl group having 1 to 20 carbon atoms, an alkenyl group having 2 to 20 carbon atoms, an aryl group having 6 to 20 carbon atoms, a sulfonate group having 1 to 20 carbon atoms, and a sulfone group having 1 to 20 carbon atoms, T' is C, Si, Ge, Sn, or Pb, $Q'_1$ and $Q'_2$ are the same as or different from each other and are each independently any one selected from hydrogen, halogen, an alkyl group having 1 to 20 carbon atoms, a heterocycloalkyl group having 2 to 20 carbon atoms, an alkoxy group having 1 to 20 carbon atoms, an alkoxy alkyl group having 1 to 20 carbon atoms, a carboxylate having 1 to 20 carbon atoms, an alkenyl group having 2 to 20 carbon atoms, an aryl group having 6 to 20 carbon atoms and a heteroaryl group having 5 to 20 carbon atoms, T1 and T2 are each independently

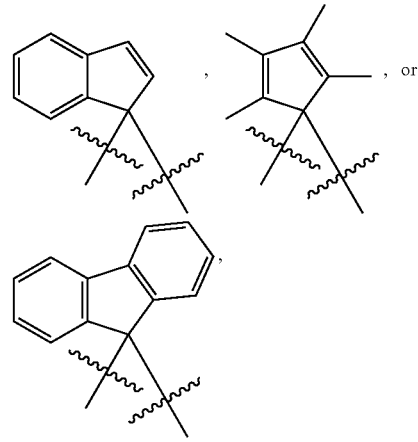

[Chemical Formula 3]

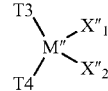

in Chemical Formula 3,

M" is Ti, Zr, or Hf, $X''_1$ and $X''_2$ are the same as or different from each other and are each independently any one selected from halogen, a nitro group, an amido group, a phosphine group, a phosphide group, an alkyl group having 1 to 20 carbon atoms, an alkoxy group having 1 to 20 carbon atoms, an alkoxyalkyl group having 2 to 20 carbon atoms, a silyl group having 1 to 20 carbon atoms, an alkenyl group having 2 to 20 carbon atoms, an aryl group having 6 to 20 carbon atoms, a sulfonate group having 1 to 20 carbon atoms, and a sulfone group having 1 to 20 carbon atoms, T" is C, Si, Ge, Sn, or Pb, $Q''_1$ and $Q''_2$ are the same as or different from each other and are each independently any one selected from hydrogen, halogen, an alkyl group having 1 to 20 carbon atoms, a heterocycloalkyl group having 2 to 20 carbon atoms, an alkoxy group having 1 to 20 carbon atoms, an alkoxy alkyl group having 1 to 20 carbon atoms, a carboxylate having 1 to 20 carbon atoms, an alkenyl group having 2 to 20 carbon atoms, an aryl group having 6 to 20 carbon atoms and a heteroaryl group having 5 to 20 carbon atoms, and T3 and T4 are each independently

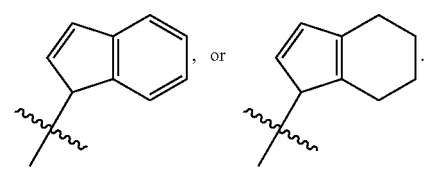 [SMILES: *C1C=Cc2ccccc21 ; *C1C=CC2=C1CCCC2]

The catalysts of the above Chemical Formulas 1 to 3 will be more concretely described in Examples below.

In addition, the hybrid catalyst may be supported on a support together with a cocatalyst compound. In addition, the hybrid catalyst can induce the generation of LCB (Long Chain Branch) in the low density polyethylene copolymer to be produced.

In the hybrid catalyst according to the present invention, the cocatalyst to be supported on the support for activation of the metallocene compound is an organometallic compound containing a Group 13 metal, and it is not particularly limited as long as it can be used when polymerizing the olefin in the presence of a general metallocene catalyst.

Specifically, the cocatalyst compound may include at least one of an aluminum-containing primary cocatalyst of the following Chemical Formula 4 and a boron-containing secondary cocatalyst of the following Chemical Formula 5.

$$-[Al(R_{18})-O-]_k-$$ [Chemical Formula 4]

in Chemical Formula 4, $R_{18}$ is each independently a halogen, a halogen-substituted or unsubstituted hydrocarbyl group having 1 to 20 carbon atoms, and k is an integer of 2 or more, $$T^+[BG_4]^-$$ [Chemical Formula 5]

in Chemical Formula 5, $T^+$ is a +1 valent polyatomic ion,

B is boron in an oxidation state of +3, and

G is each independently selected from the group consisting of hydride, dialkylamido, halide, alkoxide, aryloxide, hydrocarbyl, halocarbyl and halo-substituted hydrocarbyl, wherein the G has 20 or less carbon atoms, provided that G is halide at one or less position.

By using the first and the second cocatalysts as above, the low density polyethylene copolymer finally prepared may have more uniform molecular weight distribution, while the polymerization activity can be enhanced.

The first cocatalyst of Chemical Formula 4 may be an alkylaluminoxane-based compound wherein the repeating units are combined into a linear, circular or network form. Specific examples of the first cocatalyst may include methylaluminoxane (MAO), ethylaluminoxane, isobutylaluminoxane, butylaluminoxane, and the like.

Further, the second cocatalyst of Chemical Formula 5 may be a tri-substituted ammonium salt, or a dialkylammonium salt, or a tri-substituted phosphate type borate compound. Specific examples of the second cocatalyst may include a borate-based compound in the form of a trisubstituted ammonium salt, such as trimethylammonium tetraphenylborate, methyl dioctadecylammonium tetraphenylborate, triethylammonium tetraphenylborate, tripropylammonium tetraphenylborate, tri(n-butyl)ammonium tetraphenylborate, methyitetradecyloctadecylammonium tetraphenylborate, N,N-dimethylanilinium tetraphenylborate, N,N-diethylanilinium tetraphenylborate, N,N-dimethyl(2,4,6-trimethylanilinium)tetraphenylborate, trimethylammonium tetrakis(pentafluorophenyl)borate, methylditetradecylammonium tetrakis(pentaphenyl)borate, methyldioctadecylammonium tetrakis(pentafluorophenyl)borate, triethylammonium, tetrakis(pentafluorophenyl)borate, tripropylammonium tetrakis(pentafluorophenyl)borate, tri(n-butyl)ammonium tetrakis(pentafluorophenyl)borate, tri(sec-butyl)ammonium tetrakis(pentafluorophenyl)borate, N,N-dimethylanilinium tetrakis(pentafluorophenyl)borate, N,N-diethylanilinium tetrakis(pentafluorophenyl)borate, N,N-dimethyl(2,4,6-trimethylanilinium)tetrakis(pentafluorophenyl)borate, trimethylammonium tetrakis(2,3,4,6-tetrafluorophenyl)borate, triethylammonium tetrakis(2,3,4,6-tetrafluorophenyl)borate, tripropylammonium tetrakis(2,3,4,6-tetrafluorophenyl)borate, tri(n-butyl)ammonium tetrakis(2,3,4,6-tetrafluorophenyl)borate, dimethyl(t-butyl)ammonium tetrakis(2,3,4,6-tetrafluorophenyl)borate, N,N-dimethylanilinium tetrakis(2,3,4,6-tetrafluorophenyl)borate, N,N-diethylanilinium tetrakis(2,3,4,6-tetrafluorophenyl)borate or N,N-dimethyl-(2,4,6-trimethylanilinium)tetrakis-(2,3,4,6-tetrafluorophenyl)borate and the like; a borate-based compound in the form of a dialkylammonium salt, such as dioctadecylammonium tetrakis(pentafluorophenyl)borate, ditetradecylammonium tetrakis(pentafluorophenyl)borate or dicyclohexylammonium tetrakis(pentafluorophenyl)borate; or a borate-based compound in the form of a trisubstituted phosphonium salt, such as triphenylphosphonium tetrakis (pentafluorophenyl)borate, methyldioctadecylphosphonium tetrakis(pentafluorophenyl)borate or tri(2,6-dimethylphenyl)phosphonium tetrakis(pentafluorophenyl)borate.

In the supported metallocene catalyst according to the present invention, the mass ratio between the whole transition metals contained in the metallocene compound represented by Chemical Formula 1 or the metallocene compound represented by Chemical Formulas 2 or 3 and the support may be 1:10 to 1:1,000. When the support and the metallocene compound are contained in the range of the above mass ratio, an optimal shape can be provided. The mass ratio of the cocatalyst compound to the support may be 1:1 to 1:100.

In the hybrid supported catalyst according to the present invention, as the support, a support containing a hydroxy group on its surface can be used, and preferably a support having highly reactive hydroxy group and siloxane group, of which the surface is dried and removed of moisture can be used.

For example, silica, silica-alumina, silica-magnesia or the like, which are dried at high temperature, can be used, and they may typically contain oxides, carbonates, sulfates, and nitrates such as $Na_2O$, $K_2CO_3$, $BaSO_4$ and $Mg(NO_3)_2$.

The drying temperature of the support is preferably 200 to 800° C., more preferably 300 to 600° C., and most preferably 300 to 400° C. If the drying temperature of the support is lower than 200° C., it retains moisture too much so that moisture on the surface is reacted with the cocatalyst. If the drying temperature is higher than 800° C., pores on the surface of the support are combined with each other to reduce surface area, and many hydroxyl groups are lost on the surface to remain only siloxane groups. Thus, since the reactive sites with cocatalyst are reduced, it is not preferable.

The amount of hydroxyl group on the surface of the support is preferably 0.1 to 10 mmol/g, and more preferably 0.5 to 5 mmol/g. The amount of hydroxyl group on the surface of the support may be controlled depending on the preparation method and conditions of the support, or drying conditions such as temperature, time, vacuum, spray drying, and the like.

If the amount of hydroxyl group is less than 0.1 mmol/g, the reactive sites with cocatalyst are reduced. If the amount of hydroxyl group is more than 10 mmol/g, it is not desirable because it may be caused by moisture besides the hydroxyl groups present on the surface of support particles.

On the other hand, the low density polyethylene copolymer according to the present invention can be produced by polymerizing ethylene and alpha-olefin in the presence of the hybrid catalyst described above.

The polymerization reaction may be carried out by copolymerizing ethylene and alpha-olefin, using a continuous slurry polymerization reactor, a loop slurry reactor, a gas phase reactor, or a solution reactor.

The polymerization temperature may be about 25 to about 500° C., preferably about 25 to about 200° C., and more preferably about 50 to about 150° C. Further, the polymerization pressure may be from about 1 to about 100 Kgf/cm², preferably from about 1 to about 50 Kgf/cm², more preferably from about 5 to about 30 Kgf/cm².

The hybrid catalyst can be injected after being dissolved or diluted in an aliphatic hydrocarbon solvent having 5 to 12 carbon atoms such as pentane, hexane, heptane, nonane, decane, and isomers thereof, an aromatic hydrocarbon solvent such as toluene and benzene, or a hydrocarbon solvent substituted with chlorine atom such as dichloromethane and chlorobenzene. It is preferable that the solvent is used after a small amount of water, air or the like acting as a catalyst poison is removed by treating with a small amount of alkyl aluminum. It may also be performed using an additional cocatalyst.

Advantageous Effects

The low density polyethylene copolymer according to the present invention is characterized in that as LCB (Long Chain Branch) is introduced into LLDPE, the melt strength is remarkably high even without blending with LDPE, and thus it can be advantageously applied to blown film processing and the like.

BRIEF DESCRIPTION OF THE DRAWINGS

FIG. 1 shows the results of measurement of the melt strength of the polyethylene of Examples and Comparative Examples of the present invention.

DETAILED DESCRIPTION OF THE EMBODIMENTS

Hereinafter, preferred Examples are provided for better understanding of the present invention. However, these Examples are for illustrative purposes only and the invention is not intended to be limited by these Examples.

PREPARATION EXAMPLE 1

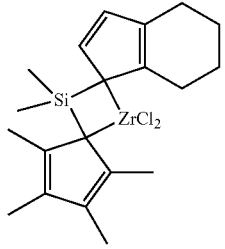

(1) Tetramethylcyclopentadiene (TMCP, 6.0 mL, 40 mmol) was dissolved in THF (60 mL) in a dried 250 mL Schlenk flask and then cooled to −78° C. Then n-BuLi (2.5 M, 17 mL, 42 mmol) was slowly added dropwise to the above solution, and the mixture was stirred overnight at room temperature. On the other hand, dichlorodimethylsilane (4.8 mL, 40 mmol) was dissolved in n-hexane in another 250 mL Schlenk flask and then cooled to −78° C. Then, the TMCP-lithiation solution previously prepared was slowly added to this solution, and the mixture was stirred overnight at room temperature. Thereafter, the resulting solution was subjected to reduced pressure to remove solvent. The resulting solid was dissolved in toluene and filtered to remove residual LiCl, thereby obtaining an intermediate (yellow liquid, 7.0 g, 33 mmol, 83% yield).

$^1$H NMR (500 MHz, CDCl$_3$): 0.24 (6H, s), 1.82 (6H, s), 1.98 (6H, s), 3.08 (1H, s)

Indene (0.93 mL, 8.0 mmol) was dissolved in THF (30 mL) in a dried 250 mL Schlenk flask and then cooled to −78° C. Then n-BuLi (2.5 M, 3.4 mL, 8.4 mmol) was slowly added dropwise to the above solution, and the mixture was stirred at room temperature for about 5 hours. On the other hand, the intermediate (1.7 g, 8.0 mmol) previously synthesized was dissolved in THF in another 250 mL Schlenk flask and then cooled to −78° C. Then, the indene-lithiation solution previously prepared was slowly added to this solution, and the mixture was stirred overnight at room temperature to obtain a purple solution. Thereafter, water was poured into the reactor to quench the reaction, and the organic layer was extracted with ether from the mixture. It was confirmed by $^1$H NMR that dimethyl(indenyl)(tetramethylcyclopentadienyl)silane and another kind of organic compound were contained in the organic layer. The organic layer was concentrated without purification and used directly for metallation.

(2) Dimethyl(indenyl) (tetramethylcyclopentadienyl) silane (1.7 g, 5.7 mmol) previously synthesized was dissolved in toluene (30 mL) and MTBE (3.0 mL) in a 250 mL Schlenk flask. After cooling to −78° C., n-BuLi (2.5 M, 4.8 mL, 12 mmol) was slowly added dropwise to the above solution, and then stirred overnight at room temperature. However, a yellow solid was formed in the above solution and not stirred uniformly, and thus MTBE (50 mL) and THF (38 mL) were further added thereto. On the other hand, ZrCl$_4$(THF)$_2$ was dispersed in toluene in another 250 mL Schlenk flask and then cooled to −78° C. Subsequently, the lithiated ligand solution previously prepared was slowly added to the above mixture and stirred overnight. The reaction product was then filtered to obtain a yellow solid (1.3 g, including 0.48 g of LiCl, 1.8 mmol). The solvent was removed from the filtrate and washed with n-hexane to give a yellow solid (320 mg, 0.70 mmol) (total 44% yield).

$^1$H NMR (500 MHz, CDCl$_3$): 0.96 (3H, s), 1.16 (3H, s), 1.91 (3H, s), 1.93 (3H, s), 1.96 (3H, s), 1.97 (3H, s), 5.98 (1H, d), 7.07 (1H, t), 7.23 (1H, d), 7.35 (1H, t), 7.49 (1H, d), 7.70 (1H, d)

(3) The compound synthesized in the above (2) (1.049 g, 2.3 mmol) was put into a mini bombe in a glove box. Then, platinum oxide (52.4 mg, 0.231 mmol) was further put into the mini bombe. After the mini bombe was assembled, anhydrous THF (30 mL) was added via cannula to the mini bombe, and filled with hydrogen up to pressure of about 30 bar. Subsequently, the mixture put in the mini bombe was stirred at about 60° C. for about 1 day, then the temperature of the mini bombe was cooled to room temperature, and hydrogen was replaced with argon while gradually lowering the pressure of the mini bombe. On the other hand, celite dried in an oven at about 120° C. for about 2 hours was laid on a schlenk filter, and the reaction product of the mini bombe was filtered under argon. The PtO$_2$ catalyst was removed from the reaction product through celite. Subsequently, the catalyst-removed reaction product was subjected to reduced pressure to remove the solvent, and thereby the product was obtained as a pale yellow solid (0.601 g, 1.31 mmol, Mw: 458.65 g/mol).

$^1$H NMR (500 MHz, CDCl$_3$): 0.82 (3H, s), 0.88 (3H, s), 1.92 (6H, s), 1.99 (3H, s), 2.05 (3H, s), 2.34 (2H, m), 2.54 (2H, m), 2.68 (2H, m), 3.03 (2H, m), 5.45 (1H, s), 6.67 (1H, s)

PREPARATION EXAMPLE 2

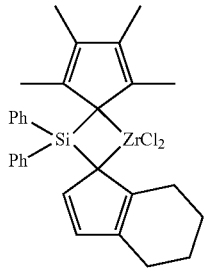

(1) TMCP-Li (1.3 g, 10 mmol), CuCN (45 mg, 5 mol %) and THF (10 mL) were added to a 250 mL Schlenk flask. Dichlorodiphenylsilane (2.5 g, 10 mmol) was added dropwise at −20° C. or lower, and the mixture was stirred at room temperature for 16 hours. The temperature was lowered to −20° C. to which indene-Li (1.2 g, 10 mmol in 10 mL of THF) was added dropwise. The mixture was stirred at room temperature for 24 hours and dried under vacuum to remove the solvent. Filtration with hexane was carried out to remove LiCl, and hexane of filtrate was dried under vacuum to obtain an intermediate.

The intermediate prepared above (4.2 g, 10 mmol) and THF (15 mL) were added to a 100 mL Schlenk flask and then the temperature was lowered to −20° C. n-BuLi (2.5 M in Hexane, 8.4 mL, 21 mmol) was slowly added dropwise, and the mixture was stirred at room temperature for 6 hours. ZrCl$_4$(THF)$_2$ (3.8 g, 10 mmol) and toluene (15 mL) were added to a 250 mL Schlenk flask and the mixture was stirred at −20° C. or lower. The lithiated ligand solution was slowly added thereto. The reaction mixture was stirred at room temperature for 48 hours and then dried under vacuum to remove the solvent. After dissolving in dichloromethane and filtering to remove LiCl, dichloromethane was dried under vacuum. 30 mL of toluene was added thereto and the mixture was stirred for 16 hours and then filtered to obtain an intermediate (2.1 g, 3.6 mmol, yield 36%) as a lemon-colored solid.

$^1$H NMR (500 MHz, CDCl$_3$): 8.08-8.12 (m, 2H), 7.98-8.05 (m, 2H), 7.77 (d, 1H), 7.47-7.53 (m, 3H), 7.42-7.46 (m, 3H), 7.37-7.41 (m, 2H), 6.94 (t, 1H), 6.23 (d, 1H), 1.98 (s, 3H), 1.95 (s, 3H), 1.68 (s, 3H), 1.52 (s, 3H)

(2) The intermediate finally prepared in the above (1) (1.0 g, 1.7 mmol), Pd/C (10 mol %) and dichloromethane (40 mL) were injected into a 100 mL high pressure reactor and filled with H2 (60 bar) followed by stirring at 80° C. for 24 hours. Upon completion of the reaction, the reaction product was passed through a celite pad to remove the solid, and thereby the product (0.65 g, 1.1 mmol, yield 65%) was obtained.

$^1$H NMR (500 MHz, CDCl$_3$): 7.90-8.00 (m, 4H), 7.38-7.45 (m, 6H), 6.80 (s, 1H), 5.71 (s, 1H), 3.50-3.15 (m, 1H), 2.75-2.85 (m, 1H), 2.50-2.60 (m, 1H), 2.12 (s, 3H), 2.03 (s, 3H), 1.97-2.07 (m, 1H), 1.76 (s, 3H), 1.53-1.70 (m, 4H), 1.48 (s, 3H)

PREPARATION EXAMPLE 3

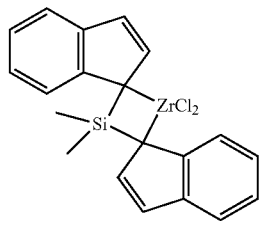

Purchased from Strem Corporation and used (CAS No.: 121009-93-6).

PREPARATION EXAMPLE 4

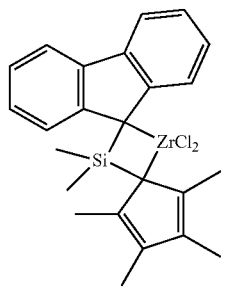

(1) Fluorine (1.622 g, 10 mmol) was added to a dried 250 mL Schlenk flask to which 200 mL of THF was added under argon. After the above solution was cooled to 0° C., 4.8 mL (12 mmol) of 2.5 M n-BuLi hexane solution was slowly added dropwise. After raising the temperature slowly to room temperature, the mixture was stirred until the next day. On the other hand, a solution of dichlorodimethylsilane (1.2 mL, 10 mmol, Fw 129.06, d 1.07 g/mL) and hexane (30 mL) was added to another 250 mL Schlenk flask and cooled to −78° C. Then, the lithiated solution previously prepared was added dropwise to this solution. The temperature was slowly raised to room temperature and then stirred overnight. At the same time, 10 mmol of tetramethylcyclopentadiene was cooled to 0° C. in THF solvent, to which 4.8 mL (12 mmol) of 2.5 M n-BuLi hexane solution was slowly added dropwise and subjected to lithiation reaction for one day. The next day, chloro(9H-fluoren-9-yl) dimethylsilane and lithiated 4-methylcyclopentadiene flask were put together at room temperature through cannula. At this time, the direction turning to the cannula does not affect the experiment. After stirring for 1 day, 50 mL of water was added in a flask and quenched. The organic layer was separated and dried with MgSO$_4$. As a result, 3.53 g (10.25 mmol, 100%) of a yellow powder was obtained. NMR standard purity (wt %)=100%, Mw=344.56

$^1$H NMR (500 MHz, CDCl$_3$): −0.36 (6H, s), 1.80 (6h, s), 1.94 (6H, s), 3.20 (1H, s), 4.09 (1H, s), 7.28-7.33 (4H, m), 7.52 (2H, d), 7.83 (2H, d)

(2) The ligand prepared in the above (1) was added to a dried 250 mL Schlenk flask and dissolved in diethylether to which 2.1 equivalents of n-BuLi solution (21.5 mmol, 8.6 mL) was added and subjected to lithiation reaction until the next day. The next day, all solvent diethylether was evaporated under vacuum, and then hexane slurry was passed through Schlenk filter to filter the ligand in the form of Li salt (yellow solid). The Li salt thus filtered was added to a new Schlenk flask to prepare a suspension containing 50 mL of toluene. In addition, one equivalent of $ZrCl_4(THF)_2$ was taken in a glove box and added to a 250 mL Schlenk flask to prepare a suspension containing toluene. Both flasks were cooled to −78° C. and then ligand anion was slowly added to the Zr suspension. After the addition was completed, the temperature was raised slowly to room temperature. After stirring for one day, toluene in the mixture was immediately filtered with a Schlenk filter under argon to obtain 3.551 g (6.024 mmol, 61.35% Yield) of the product in the form of a filter cake. NMR standard purity (wt %)=85.6% (the remainder is LiCl). Mw=504.68

$^1$H NMR (500 MHz, $CDCl_3$): 1.30 (6H, s), 1.86 (6H, s), 1.95 (6H, s), 7.21 (2H, m), 7.53 (2H, m), 7.65 (2H, m), 8.06 (2H, m)

PREPARATION EXAMPLE 5

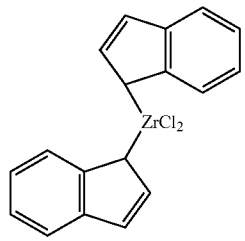

Purchased from Strem Corporation and used (CAS No.: 12148-49-1).

EXAMPLE 1

4.0 kg of toluene solution was added to a 10 L high pressure reactor to which 1000 g of silica (Grace Davison, SP2410) was added, and the mixture was stirred while raising the temperature of the reactor to 40° C. 2.1 kg of 30 wt % methylaluminoxane(MAO)/toluene solution (Albemarle) was added, the temperature was raised to 70° C., and then the mixture was stirred at 200 rpm for 12 hours. The compound (55 g) of Preparation Example 1 and the compound (22 g) of Preparation Example 3, toluene (1 L) and triisobutylaluminum (30 g) were added to a 2 L Schlenk flask and reacted at room temperature for 60 minutes. The mixture was added to a high pressure reactor, the temperature was raised to 70° C. and then stirred for 2 hours. The temperature of the reactor was lowered to room temperature, stirring was stopped, setting was made for 30 minutes and then decantation was performed. Hexane (3.0 kg) was added to the reactor and the hexane slurry solution was transferred to a filter dryer and filtered. After purging with argon (1.5 bar) for 10 minutes, it was dried under vacuum at 40° C. for 3 hours to prepare a catalyst.

EXAMPLE 2

4.0 kg of toluene solution was added to a 10 L high pressure reactor to which 1000 g of silica (Grace Davison, SP2410) was added, and the mixture was stirred while raising the temperature of the reactor to 40° C. 2.1 kg of 30 wt % methylaluminoxane(MAO)/toluene solution (Albemarle) was added, the temperature was raised to 70° C., and then the mixture was stirred at 200 rpm for 12 hours. The compound (30 g) of Preparation Example 1 and the compound (23 g) of Preparation Example 4, toluene (1 L) and triisobutylaluminum (50 g) were added to a 2 L Schlenk flask and reacted at room temperature for 60 minutes. The mixture was added to a high pressure reactor, the temperature was raised to 70° C. and then stirred for 2 hours. The temperature of the reactor was lowered to room temperature, stirring was stopped, setting was made for 30 minutes and then decantation was performed. Hexane (3.0 kg) was added to the reactor and the hexane slurry solution was transferred to a filter dryer and filtered. After purging with argon (1.5 bar) for 10 minutes, it was dried under vacuum at 40° C. for 3 hours to prepare a catalyst.

EXAMPLE 3

4.0 kg of toluene solution was added to a 10 L high pressure reactor to which 800 g of silica (Grace Davison, SP2410) was added, and the mixture was stirred while raising the temperature of the reactor to 40° C. 1.5 kg of 30 wt % methylaluminoxane(MAO)/toluene solution (Albemarle) was added, the temperature was raised to 80° C., and then the mixture was stirred at 200 rpm for 12 hours. The compound (57 g) of Preparation Example 2 and the compound (4.9 g) of Preparation Example 5, toluene (1 L) and triisobutylaluminum (25 g) were added to a 2 L Schlenk flask and reacted at 40° C. for 60 minutes. The mixture was added to a high pressure reactor, the temperature was raised to 80° C. and then stirred for 2 hours. The temperature of the reactor was lowered to room temperature, stirring was stopped, setting was made for 30 minutes and then decantation was performed. Hexane (3.0 kg) was added to the reactor and the hexane slurry solution was transferred to a filter dryer and filtered. After purging with argon (1.5 bar) for 10 minutes, it was dried under vacuum at 40° C. for 3 hours to prepare a catalyst.

EXAMPLE 4

4.0 kg of toluene solution was added to a 10 L high pressure reactor to which 800 g of silica (Grace Davison, SP2410) was added, and the mixture was stirred while raising the temperature of the reactor to 40° C. 1.5 kg of 30 wt % methylaluminoxane(MAO)/toluene solution (Albemarle) was added, the temperature was raised to 80° C., and then the mixture was stirred at 200 rpm for 12 hours. The compound (65 g) of Preparation Example 1 and the compound (4.1 g) of Preparation Example 5, toluene (1 L) and triisobutylaluminum (25 g) were added to a 2 L Schlenk flask and reacted at 40° C. for 60 minutes. The mixture was added to a high pressure reactor, the temperature was raised to 80° C. and then stirred for 2 hours. The temperature of the reactor was lowered to room temperature, stirring was stopped, setting was made for 30 minutes and then decantation was performed. Hexane (3.0 kg) was added to the reactor and the hexane slurry solution was transferred to a filter dryer and filtered. After purging with argon (1.5 bar) for 10 minutes, it was dried under vacuum at 40° C. for 3 hours to prepare a catalyst.

EXPERIMENTAL EXAMPLE (1) Preparation of Low Density Polyethylene

A continuous polymerization reactor, which is an isobutene slurry loop process, was used as a polymerization reactor. The reactor volume was 140 L and the reaction flow rate was operated at about 7 m/s. The gas streams (ethylene and hydrogen) required for polymerization and 1-hexene, which is a comonomer, were constantly and continuously added, and the individual flow rates were adjusted as needed. The concentration of all gas streams and comonomer 1-hexene were confirmed by on-line gas chromatography. As for the catalyst, the catalysts prepared in Examples 1 to 4 were used, respectively, and they were injected into isobutene slurry. The reactor pressure was maintained at 40 bar and the polymerization temperature was set to 84° C. The specific polymerization conditions were shown in Table 1 below.

TABLE 1

| Catalyst | Example 1 | Example 2 | Example 3 | Example 4 |
|---|---|---|---|---|
| Ethylene Load(kg/hr) | 25 | 24 | 24 | 23 |
| Amount of added hydrogen (ppm) | 8 | 20 | 5 | 8 |
| Amount of added hexene | 9.2 | 10.1 | 8.9 | 8.8 |
| Slurry density(g/L) | 550 | 545 | 550 | 554 |
| Activity(kg-PE/kg-SiO$_2$/hr) | 4.1 | 4.4 | 4.9 | 3.8 |
| Bulk density(g/mL) | 0.40 | 0.39 | 0.41 | 0.39 |
| Setting efficiency (%) | 50 | 49 | 53 | 52 |

(2) Confirmation of Physical Properties

Each of the low density polyethylenes prepared above was used to measure the respective physical properties as described below. In addition, for comparison, the following resins were used as comparative examples.

Comparative Example 1: LG LUCENE SP312
Comparative Example 2: Hanwha M2010
Comparative Example 3: Daelim EP2001
Comparative Example 4: Exxon Enable 2010CH
Comparative Example 5: SK NX181

1) MI (g/min): measured according to ASTM D1238 (2.16 kg, 190° C.).

2) Density (g/cm$^3$): measured according to ASTM D792.

3) MFRR: The value measured according to ASTM D1238 (21.6 kg, 190° C.) was divided by the MI.

4) MS (mN): A molten low density polyethylene copolymer was filled in a rheometer equipped with a capillary having an aspect ratio (30 mm in length/2 mm in diameter) of 15 and then applied to a shear rate of 72/s to prepare a strand, and then the melt strength was measured by a method of measuring the force (mN) at the time of breakage while uniaxially stretching it with an accelerating wheel at an initial speed of 18 mm/s and an acceleration of 12 mm/s$^2$.

5) Mw, Mz, Mw/Mn and Mz/Mw: Samples were pretreated by dissolving in 1,2,4-trichlorobenzene containing 0.0125% BHT at 160° C. for 10 hours using PL-SP260 and then Mw (weight average molecular weight), Mz (Z-average molecular weight) and Mn (number average molecular weight) were measured using PL-GPC220 Mw at a measurement temperature of 160° C.

6) $\eta_0$ and $\eta_{500}$ (P, poise): The shear viscosity was measured using an ARES instrument at 190° C. under a frequency ($\omega$ [rad/s]) range from 0.05 to 500, and then the viscosity $\eta_0$ at a frequency of zero and the viscosity ($\eta_{500}$) at the frequency of 500 were obtained using an Ellis model fit.

7) LCB shift factor ($\alpha_M$): It was calculated by substituting the previously measured viscosity ($\eta_0$) and the weight average molecular weight into the following Mathematical Formula 1-1.

$$\alpha_M = \left( \frac{\eta_0}{3.4 \times 10^{-15} \times Mw^{3.6}} - \frac{84{,}000}{3.4 \times 10^{-15} \times 125{,}381^{3.6}} \right) \times 3.4 \times 10^{-2} \quad \text{[Mathematical Formula 1-1]}$$

8) Haze: measured according to ISO 14782.

The above measurement results are shown in the following Table 2 and FIG. 1 (MS).

TABLE 2

| | Ex. 1 | Ex. 2 | Ex. 3 | Ex. 4 | Comparative Ex. 1 | Comparative Ex. 2 | Comparative Ex. 3 | Comparative Ex. 4 | Comparative Ex. 5 |
|---|---|---|---|---|---|---|---|---|---|
| MI | 0.93 | 1.07 | 0.96 | 1.07 | 0.99 | 1.16 | 0.95 | 0.96 | 1.09 |
| Density | 0.921 | 0.920 | 0.920 | 0.920 | 0.918 | 0.920 | 0.920 | 0.920 | 0.918 |
| MFRR | 28.9 | 26.9 | 36.5 | 25.5 | 21.4 | 32.6 | 37.6 | 34.1 | 34.1 |
| MS | 95 | 75 | 53 | 46 | 35 | 33 | 46 | 41 | 39 |
| Mw | 119,556 | 122,104 | 92,863 | 102,612 | 125,381 | 83,904 | 90,049 | 88,103 | 101,645 |
| Mz | 356,285 | 348,225 | 226,863 | 226,007 | 314,277 | 174,745 | 218,711 | 188,677 | 238,780 |
| Mw/Mn | 2.87 | 2.94 | 3.18 | 2.55 | 2.62 | 3.49 | 3.48 | 3.29 | 2.51 |
| Mz/Mw | 2.98 | 2.85 | 2.44 | 2.20 | 2.51 | 2.08 | 2.43 | 2.14 | 2.35 |
| $\eta_0$ | 224,000 | 145,000 | 253,000 | 155,000 | 84,000 | 131,000 | 223,000 | 177,000 | 139,000 |
| $\eta_{500}$ | 5,800 | 5,700 | 5,000 | 6,500 | 76,000 | 4,300 | 4,700 | 5,200 | 5,100 |
| $\alpha_M$ | 0.81 | 0.33 | 2.93 | 1.04 | 0.00 | 2.09 | 2.88 | 2.42 | 0.94 |
| Haze | 13.0 | 15.5 | 10.5 | 9.7 | 18.0 | 15.5 | 13.5 | 11.2 | 14.7 |

As shown in Table 2 above, it was confirmed that the low density polyethylene copolymers of Examples 1 to 4 of the present invention have a high MS value as compared with Comparative Examples 1 to 5, and thereby the film formability is remarkably excellent.

The invention claimed is:

1. A low density polyethylene copolymer which satisfies the following conditions:

a melt index (MI) of 0.5 to 1.5 g/10 min as measured according to ASTM D1238 (2.16 kg, 190° C.), a density 0.910 to 0.930 g/cm$^3$ as measured according to ASTM D792, a weight average molecular weight of 91,000 to 150,000, and a melt strength (MS) of 70 to 100 mN, wherein the low density polyethylene copolymer has $\eta_0$ (zero shear viscosity) of 140,000 P (poise) or more, and $\eta_{500}$ (viscosity measured at 500 rad/s) of 7,000 P (Poise) or less.

2. The low density polyethylene copolymer according to claim 1,
wherein the low density polyethylene copolymer has Mz (Z-average molecular weight) of 220,000 to 380,000.

3. The low density polyethylene copolymer according to claim 1,
wherein an LCB shift factor($\alpha_M$) of the following Mathematical Formula 1-1 is 0.1 to 3.0:

$$\alpha_M = \left(\frac{\eta_0}{3.4 \times 10^{-15} \times Mw^{3.6}} - \frac{84,000}{3.4 \times 10^{-15} \times 125,381^{3.6}}\right) \times 3.4 \times 10^{-2}$$
[Mathematical Formula 1-1]

in Mathematical Formula 1-1,
$\eta_0$ (zero shear viscosity) means a zero shear viscosity (unit: P) of the low density polyethylene copolymer, and Mw means a weight average molecular weight of the low density polyethylene copolymer.

4. The low density polyethylene copolymer according to claim 3, which satisfies the following Mathematical Formula 2:

$$(1.6 \times (Mz/10^5)^{2.8} + 26 \times (\alpha_M)^{0.25}) < MS < (2.1 \times (Mz/10^5)^{2.8} + 28 \times (\alpha_M)^{0.25})$$
[Mathematical Formula 2]

in Mathematical Formula 2,
Ms means the melt strength (mN) of the low density polyethylene copolymer and Mz means Z-average molecular weight (g/mol) of the low density polyethylene copolymer.

5. The low density polyethylene copolymer according to claim 1,
wherein MFRR(MFR$_{21.6}$/MFR$_{2.16}$) is 25 to 37.

6. The low density polyethylene copolymer according to claim 1,
wherein Mz/Mw is 2.0 to 3.0.

7. The low density polyethylene copolymer according to claim 1,
wherein the molecular weight distribution (Mw/Mn) of 2.5 to 3.5.

8. The low density polyethylene copolymer according to claim 1,
wherein the low density polyethylene copolymer has a haze value of 20 or less as measured according to ISO 14782.

9. The low density polyethylene copolymer according to claim 1,
wherein the low density polyethylene copolymer is a copolymer of ethylene and an alpha-olefin having 3 to 20 carbon atoms.

10. The low density polyethylene copolymer according to claim 9,
wherein the alpha-olefin is one or more selected from the group consisting of 1-butene, 1-pentene, 1-hexene, 4-methyl-1-pentene, 1-octene, 1-decene, 1-dodecene, 1-tetradecene, 1-hexadecene, 1-octadecene, and 1-eicosene.

11. The low density polyethylene copolymer according to claim 1,
wherein the low density polyethylene copolymer is prepared by using i) a hybrid catalyst containing a metallocene catalyst represented by the following Chemical Formula 1, and ii) a metallocene catalyst represented by the following Chemical Formula 2 or Chemical Formula 3:

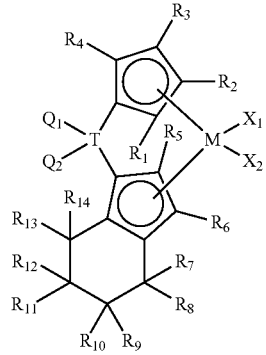

[Chemical Formula 1]

in Chemical Formula 1,
M is Ti, Zr, or Hf,
$X_1$ and $X_2$ are the same as or different from each other and are each independently selected from halogen, a nitro group, an amido group, a phosphine group, a phosphide group, an alkyl group having 1 to 20 carbon atoms, an alkoxy group having 1 to 20 carbon atoms, an alkoxyalkyl group having 2 to 20 carbon atoms, a silyl group having 1 to 20 carbon atoms, an alkenyl group having 2 to 20 carbon atoms, an aryl group having 6 to 20 carbon atoms, a sulfonate group having 1 to 20 carbon atoms, or a sulfone group having 1 to 20 carbon atoms,
T is C, Si, Ge, Sn, or Pb,
$Q_1$ and $Q_2$ are the same as or different from each other and are each independently selected from hydrogen, halogen, an alkyl group having 1 to 20 carbon atoms, a heterocycloalkyl group having 2 to 20 carbon atoms, an alkoxy group having 1 to 20 carbon atoms, an alkoxy alkyl group having 1 to 20 carbon atoms, a carboxylate having 1 to 20 carbon atoms, an alkenyl group having 2 to 20 carbon atoms, an aryl group having 6 to 20 carbon atoms or a heteroaryl group having 5 to 20 carbon atoms,
$R_1$ to $R_6$ are the same as or different from each other, and are each independently selected from hydrogen, an alkyl group having 1 to 20 carbon atoms, an alkoxy group having 1 to 20 carbons, an alkoxyalkyl group having 2 to 20 carbons, a silyl group having 1 to 20 carbons, a silylalkyl group having 1 to 20 carbon atoms, a silyloxyalkyl group having 1 to 20 carbon atoms, an alkenyl group having 2 to 20 carbon atoms or an aryl group having 6 to 20 carbon atoms,
$R_7$ to $R_{14}$ are the same as or different from each other and are each independently selected from hydrogen, an alkyl group having 1 to 20 carbon atoms, an alkoxy group having 1 to 20 carbons, an alkoxyalkyl group having 2 to 20 carbons, a silyl group having 2 to 20 carbons, a silylalkyll group having 1 to 20 carbon atoms, a silyloxyalkyl group having 1 to 20 carbon atoms, an alkenyl group having 2 to 20 carbon atoms or an aryl group having 6 to 20 carbon atoms, or at least one pair of adjacent substituents of the $R_7$ to $R_{14}$ are connected to each other to form a substituted or unsubstituted aliphatic or aromatic ring;

[Chemical Formula 2]

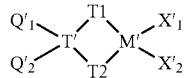

in Chemical Formula 2,

M' is Ti, Zr, or Hf, $X'_1$ and $X'_2$ are the same as or different from each other and are each independently selected from halogen, a nitro group, an amido group, a phosphine group, a phosphide group, an alkyl group having 1 to 20 carbon atoms, an alkoxy group having 1 to 20 carbon atoms, an alkoxyalkyl group having 2 to 20 carbon atoms, a silyl group having 1 to 20 carbon atoms, an alkenyl group having 2 to 20 carbon atoms, an aryl group having 6 to 20 carbon atoms, a sulfonate group having 1 to 20 carbon atoms, or a sulfone group having 1 to 20 carbon atoms, T' is C, Si, Ge, Sn, or Pb, $Q'_1$ and $Q'_2$ are the same as or different from each other and are each independently selected from hydrogen, halogen, an alkyl group having 1 to 20 carbon atoms, a heterocycloalkyl group having 2 to 20 carbon atoms, an alkoxy group having 1 to 20 carbon atoms, an alkoxy alkyl group having 1 to 20 carbon atoms, a carboxylate having 1 to 20 carbon atoms, an alkenyl group having 2 to 20 carbon atoms, an aryl group having 6 to 20 carbon atoms or a heteroaryl group having 5 to 20 carbon atoms, T1 and T2 are each independently

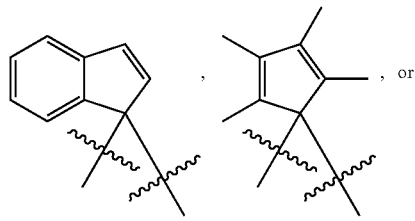

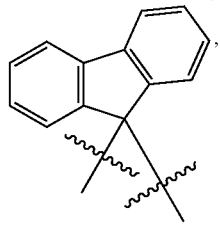

[Chemical Formula 3]

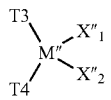

in Chemical Formula 3,

M" is Ti, Zr, or Hf, $X''_1$ and $X''_2$ are the same as or different from each other and are each independently selected from halogen, a nitro group, an amido group, a phosphine group, a phosphide group, an alkyl group having 1 to 20 carbon atoms, an alkoxy group having 1 to 20 carbon atoms, an alkoxyalkyl group having 2 to 20 carbon atoms, a silyl group having 1 to 20 carbon atoms, an alkenyl group having 2 to 20 carbon atoms, an aryl group having 6 to 20 carbon atoms, a sulfonate group having 1 to 20 carbon atoms, or a sulfone group having 1 to 20 carbon atoms, and T3 and T4 are each independently

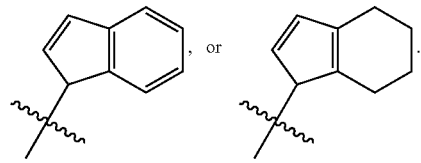 [SMILES: *C1C=Cc2ccccc21 ; *C1C=CC2=C1CCCC2]

* * * * *